US006826243B1

(12) United States Patent
Muth

(10) Patent No.: US 6,826,243 B1
(45) Date of Patent: Nov. 30, 2004

(54) CIRCUIT ARRANGEMENT FOR THE PROCESSING OF BINARY SIGNALS

(75) Inventor: Matthias Muth, Stelle (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/426,520

(22) Filed: Oct. 26, 1999

(30) Foreign Application Priority Data

Oct. 29, 1998  (DE) .......................................... 198 49 909

(51) Int. Cl.⁷ ............................................... H04L 7/00
(52) U.S. Cl. ...................... 375/354; 375/316; 375/340
(58) Field of Search ................................ 375/316, 354, 375/340, 377; 307/112; 327/13, 14; 341/111; 365/78; 713/400, 600; 711/200

(56) References Cited

U.S. PATENT DOCUMENTS

| | | | |
|---|---|---|---|
| 5,250,858 A | | 10/1993 | Strong .......................... 307/465 |
| 5,392,318 A | * | 2/1995 | Ellis et al. ................... 375/371 |
| 6,055,619 A | * | 4/2000 | North et al. ................... 712/36 |
| 6,249,542 B1 | * | 6/2001 | Kohli et al. ................. 375/150 |
| 6,418,176 B1 | * | 7/2002 | Ho et al. ..................... 375/372 |
| 6,535,045 B1 | * | 3/2003 | Vangal ........................ 327/333 |

OTHER PUBLICATIONS

"Increasing Data Read Rate From Memories" 700 IBM Technical Disclosure Bulletin, May 30, 1988 No. 12, IBM Corp. Armonk, New York, USA.
A VLSI System for Real–Time Linear Operations and Transforms, IEEE Trans. on Signal Processing, vol. 39, Book 8, Aug. 1991; pp. 1914–1917.
Brodersen et al., "VLSI Signal Processing, 111", published in IEEE Press, New York, USA 1988, pp. 50–60, entitled Speech Codec Architecture for Pan–European Digital Mobile Radio Using Bit–Serial Processing.

* cited by examiner

*Primary Examiner*—Tesfaldet Bocure
*Assistant Examiner*—Pankaj Kumar
(74) *Attorney, Agent, or Firm*—Aaron Waxler

(57) ABSTRACT

A circuit arrangement for the processing of binary signals. The circuit arrangement includes at least one logic arrangement for outputting a binary output signal and at least one storage arrangement for storing the binary output signal, wherein at least one of the storage arrangements includes a number of storage cells.

3 Claims, 3 Drawing Sheets

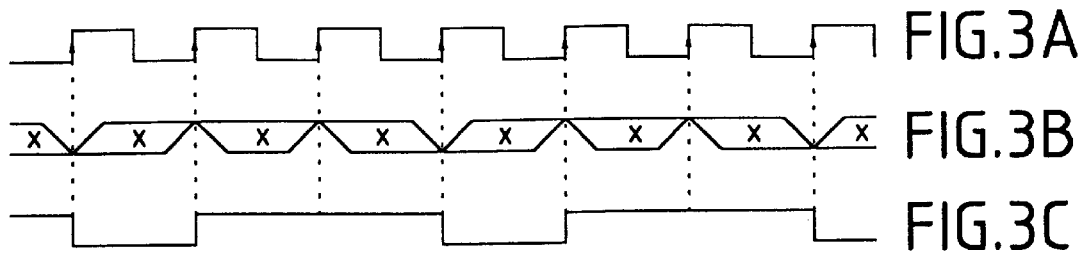
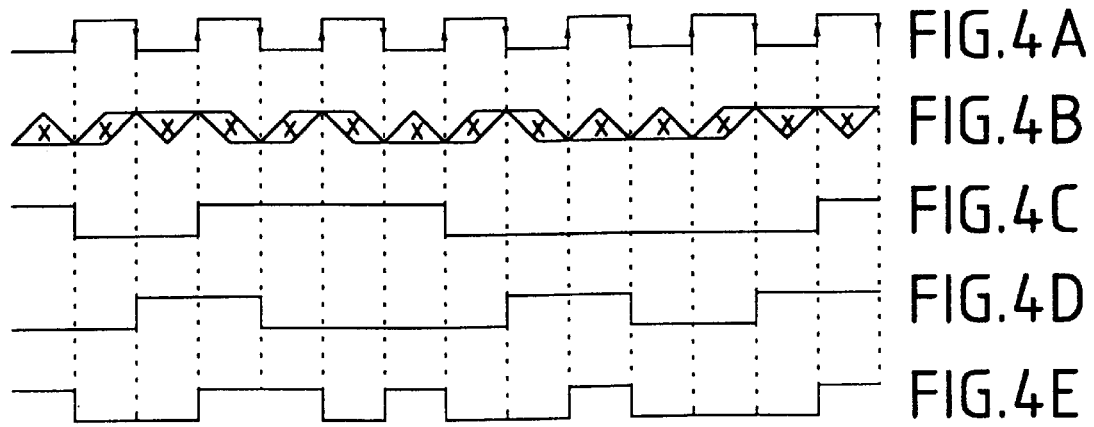

US 6,826,243 B1

CIRCUIT ARRANGEMENT FOR THE PROCESSING OF BINARY SIGNALS

BACKGROUND OF THE INVENTION

The invention relates to a circuit arrangement for the processing of binary signals.

The article "A VLSI System for Real-Time Linear Operations and Transforms", published in IEEE Transactions on Signal Processing, Vol. 39, book 8, August 1991, pp. 1914 to 1917, describes a VLSI system for the calculation of products of vector matrices which includes a double clock diagram with which circuit elements can be controlled so as to perform identical calculation operations in the multiplex mode. Because of such multiple use of the circuit elements, the highest permissible operating frequency is made available in the circuit for an external data bandwidth, offering an improved ratio of the signal processing capacity to the circuit requirements in respect of crystal surface area in an integrated circuit arrangement. A system is described in which an internal clock frequency is four times higher than the clock frequency of the externally supplied data. The internal clock frequency in one example amounts to 40 MHz whereas the frequency on an output data bus amounts to only 10 MHz.

The conference proceedings "VLSI Signal Processing, III", published in IEEE Press, New York, USA, 1988, pp. 50 to 60, "Speech Codec Architecture for Pan-European Digital Mobile Radio Using Bit-Serial Signal Processing" discloses the construction of an integrated circuit for the encoding of speech signals which is intended notably for digital mobile radio. The algorithm used for such encoding is implemented in a bit-serial circuit structure without programmable parts. Critical circuit elements between different function blocks of the system operate in time multiplex in said circuit structure. The aim is to achieve a significant reduction of the surface area for the circuit as well as a reduction of the power consumption. The time multiplex used therein operates in such a manner that circuit elements which are only temporarily required are also used by other circuit elements during their idle time which usually covers several continuous clock periods.

SUMMARY OF THE INVENTION

It is an object of the invention to construct a circuit arrangement of the kind set forth in such a manner that, on the basis of an arrangement in which binary signals are internally processed with the same repetition frequency as that at which their output signals occur, a simple, fast and clear circuit concept is possible for operation at an internal repetition frequency which is higher than the repetition frequency of the output signal and at least substantially independent of the signal processing to be carried out.

The object according to the invention is achieved by means of a circuit arrangement for the processing of binary signals which includes:

at least one logic arrangement for outputting each time at least one binary output signal, and for each logic arrangement at least one storage arrangement for storing the binary output signal, or the binary output signals, at instants which are defined by a clock signal which exhibits state transitions which occur in a cyclical sequence, at least one of the storage arrangements including a number of storage cells, each of which includes a respective output and stores, at the instant of an associated state transition within each of the cycles of the clock signal, the instantaneous value of each time one of the binary output signals and outputs it via its output, the outputs of the storage cells of each time one of the storage arrangements being connected to a common output of the relevant storage arrangements a switching stage whereby the output of each storage cell is connected, in the time interval which commences with the associated state transition of the clock signal and terminates with the next state transition of the clock signal in the cyclical sequence, to the common output of the relevant storage arrangement.

The circuit arrangement according to the invention is segmented in such a manner that the logic arrangement and the storage arrangement or arrangements are arranged so as to be functionally separated and preferably also spatially separated from one another. For operation of this circuit arrangement, during which the internal signal processing takes place at the same repetition frequency, notably within the logic arrangement (arrangements), as that of the output of the output signals, the storage arrangement or arrangements can be constructed in a conventional manner, the internal signal processing and output signals preferably being controlled at the same clock frequency.

However, if the described circuit arrangement is provided with a storage arrangement according to the invention instead of with a conventional storage arrangement(s), it is possible, without making any additional modifications, to operate such that a number of signal processing steps which corresponds to the number of state transitions of the clock signal within each cycle can be executed during each of the cycles of the clock signal. The values of the output signal or output signals of the logic arrangement (arrangements) resulting from these individual processing steps within a cycle are stored in each time a respective one of the storage cells of the storage arrangement (arrangements). This enables multiple use of the logic arrangement within a cycle of the clock signal. A saving in respect of circuit elements is thus achieved, because the logic arrangement (arrangements) need no longer be provided in parallel in a number which corresponds to the number of state transitions within a cycle of the clock signal.

A particularly significant saving in respect of circuit elements is achieved for circuit arrangements in which the logic arrangement (arrangements) is (are) very large in comparison with the storage arrangement or storage arrangements. Dual use of the logic arrangement (arrangements) can then save a high percentage of circuit elements, preferably crystal surface area in the case of integrated circuits, because the storage arrangement (arrangements) constructed according to the invention require only few circuit means. When a circuit arrangement of this kind has a plurality of logic arrangements and a plurality of storage arrangements, the principle of the invention is applied to as many of these storage arrangements as possible so that the saving is maximized.

A particularly simple embodiment of the circuit arrangement according to the invention is obtained when at least one of the storage arrangements includes two storage cells which are constructed as D-flipflops and whose clock inputs can be supplied with a clock signal in the form of an at least approximately square-wave signal, a first one of the D-flipflops of the storage arrangement (arrangements) being driven by the ascending edge for the purpose of storage whereas the second one of the D-flipflops is driven by the descending edge, the switching stage being controlled in conformity with the levels of the clock signal between the state transitions.

A circuit arrangement having such a construction enables the repetition frequency of the internal signal processing to be increased to double the clock frequency, it merely being necessary to replace conventional storage arrangements by those according to the invention. In each cycle of the clock signal two signal values can be processed independently of one another. It is notably possible to process two completely independent binary signals in a logic arrangement and to store these signals in the two storage cells of the storage arrangement (arrangements) without mutual influencing.

Preferably, the instantaneous values of the binary output signals at the instants of corresponding state transitions in successive cycles of the clock signals are associated with a respective, separate data stream. This is because the invention particularly simply enables bit by bit processing of such separate data streams in a time-interleaved manner within each of the cycles of the clock signal, without mutual influencing, by the same logic arrangement (arrangements). For the bit by bit processing of two interleaved data streams, i.e. for the processing of two binary signals instantaneous value by instantaneous value, notably a first one of the data streams is processed in such a manner that its instantaneous values are stored during the ascending edges of the clock signal whereas the instantaneous values of the second signal are stored during the descending edges of the clock signal.

In the circuit arrangement according to the invention the processed data streams appear bit interleaved on the common output of the switching stage, or on the common outputs of the switching stages, for further processing in the same way.

However, the binary signals on such a common output can be de-interleaved at any time by a demultiplexing operation which can be simply controlled by the clock signal. This enables very simple combination of serial processing of the signals and their parallel output.

The invention can be very universally used for a variety of products for electronic data processing. In an example of an application for the drive of a "Controller Area Network" (CAN), the repetition frequency of the serial data processing could be doubled while adding only 7.5% to the circuit means.

BRIEF DESCRIPTION OF THE DRAWING

Embodiments of the invention are shown in the drawing and will be described in detail hereinafter.

FIG. 3 shows the variation in time of some signals in the circuit arrangement of FIG. 1, FIG. 4 shows the variation in time of some signals in the circuit arrangement of FIG. 2.

DESCRIPTION OF THE PREFERRED EMBODIMENT

Figure 1:
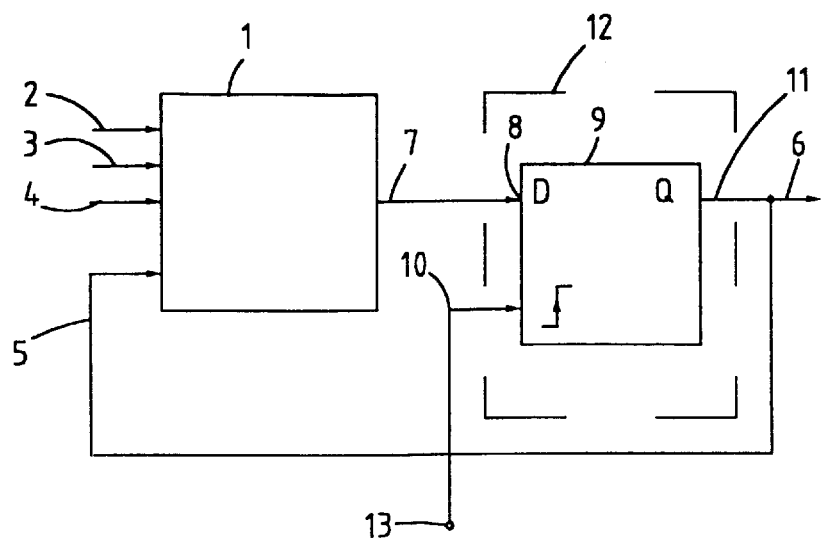
FIG. 1 shows a circuit arrangement for the processing of binary signals which includes a logic arrangement and a storage arrangement.

The reference numeral 1 in the circuit arrangement shown in FIG. 1 denotes a logic arrangement which preferably includes combinatory logic components, but no clock-dependent elements storing a signal. The logic arrangement 1 has, for example, three inputs 2, 3, 4 for the supply of binary signals which are processed, i.e. combined, in an arbitrary manner in the logic arrangement 1. In the embodiment shown in FIG. 1 the logic arrangement 1 also includes a further input 5 via which a binary output signal, present on a common output 6 of the circuit arrangement, can be retrocoupled, said output signal also being involved in said logic combination operations. The combination operations produce a binary output signal which is output via an output 7 of the logic arrangement 1 so as to be applied to a signal input 8 of a storage cell 9. In the embodiment shown in FIG. 1 the storage cell 9 is constructed as a D-flipflop. The flipflop has a clock input 10 which can be supplied with an at least substantially square-wave clock signal during operation. The ascending and descending edges of said clock signal constitute cyclically successive state transitions; one cycle of the clock signal corresponds to one period duration thereof. The storage cell 9 is constructed in such a manner that in response to each ascending edge of the clock signal the instantaneous value of the binary output signal of the logic arrangement 1, supplied via the signal input 8, is stored and output, via an output 11 of the storage cell, until the appearance of the next ascending edge of the clock signal. The storage cell 9 constitutes a storage arrangement 12 in the embodiment shown in FIG. 1.

FIG. 3 illustrates the operation of the circuit arrangement of FIG. 1 on the basis of an exemplary signal variation as a function of time. FIG. 3a) shows the variation of the square-wave clock signal on the clock input 10 of the storage cell 9 and FIG. 3b) shows the binary output signal on the output 7 of the logic arrangement 1. The binary output signal shown in FIG. 3b), formed by combination of the binary signals on the inputs 2 to 5, can change or retain its state in the time intervals between each time two ascending edges of the clock signal shown in FIG. 3a), depending on the variations of the binary signals on the inputs 2 to 5. For correct operation it is necessary, as usual, that setting or transient phenomena in the logic arrangement 1, due to the storage cell 9, have terminated at the relevant sampling instants, i.e. at the state transitions of the clock signals formed by the ascending edges of the clock signal, so that the binary output signal at the output 7 of the logic arrangement 1 has assumed a defined value. For the temporal variation of this output signal on the output 7 of the logic arrangement 1 which is assumed by way of example in FIG. 3b), the signal variation of the binary output signal on the output 11 of the storage cell 9, and hence on the common output 6, is as shown in FIG. 3c).

The circuit arrangement shown in FIG. 1 is thus used for a single data stream. When two mutually independent data streams are to be processed by way of identical logic combination operations in circuit arrangements thus constructed, a second arrangement, consisting of a logic arrangement and a storage arrangement and identical to FIG. 1, would have to be used.

Figure 2:
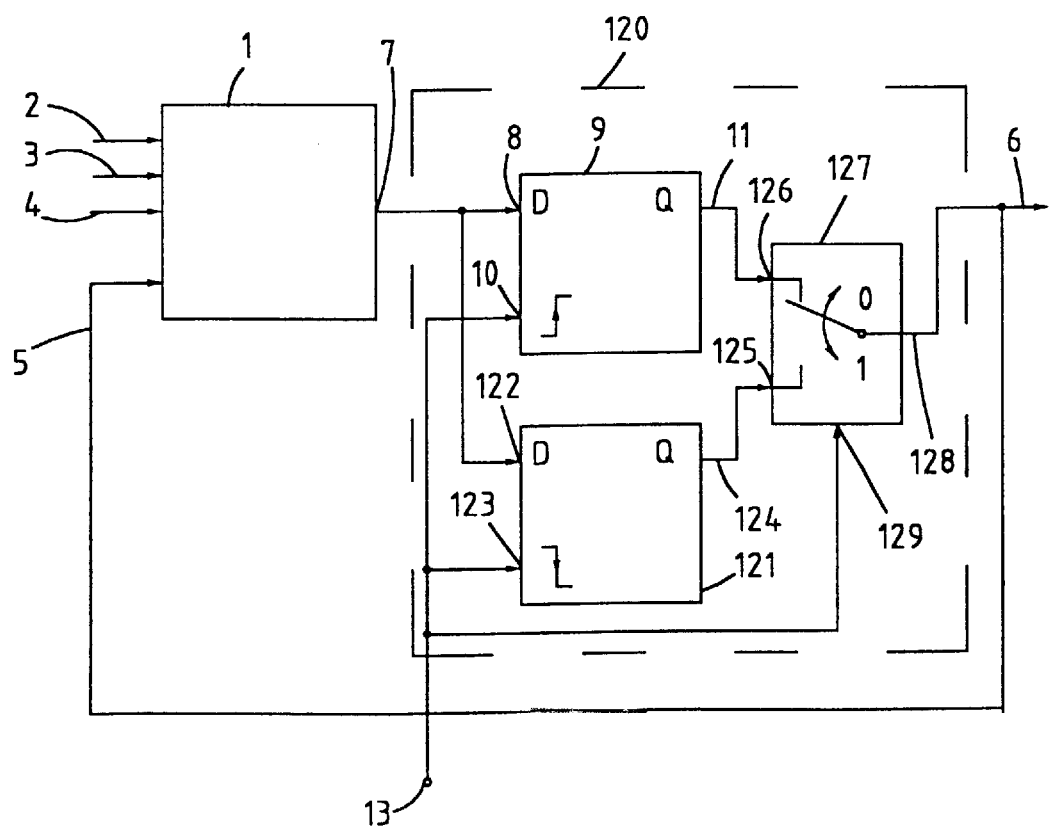
FIG. 2 shows a further version of the circuit arrangement shown in FIG. 1 in which the storage arrangement is constructed according to the invention.

In order to avoid the necessity of such additional circuit means, the circuit arrangement shown in FIG. 1 is modified in conformity with the embodiment shown in FIG. 2. Therein, corresponding elements are denoted by identical references.

The storage arrangement 12 has been replaced by a storage arrangement 120 in the circuit arrangement shown in FIG. 2. In addition to the already described storage cell 9, the storage arrangement 120 includes a further storage cell 121 whose signal input 122 is connected, together with the signal input 8 of the (first) storage cell 9, to the output 7 of the logic arrangement 1. A clock input 123 of the further storage cell 121 is connected, together with the clock input of the (first) storage cell 9, to a clock lead 13 wherefrom the clock signal for the storage cell 9 can be derived in the same way as in the circuit arrangement shown in FIG. 1. The further storage cell 12 is modified with respect to the (first) storage cell 9 in that the storage operation therein takes place in response to the descending edge of the clock signal. Furthermore, an output 124 of the further storage cell 121 and the output 11 of the (first) storage cell 9 are connected to a respective input 125, 126 of a switching stage 127. The output 128 thereof is connected to the common output 6 of the circuit arrangement. A control input 129 of the switching stage 127 is connected to the clock lead 13. Under the control of the clock signal on the control input 129, the switching stage 127 establishes a connection between the (first) input 125 and the output 128 when the clock signal assumes a high logic level, whereas it establishes a connection between the (second) input 126 and the output 128 when the clock signal assumes a low logic level. The state transition in the clock signal thus cyclically switches over the switching stage 127.

FIG. 4 shows an example of the operation of the circuit arrangement of FIG. 2. FIG. 4*a*) again shows the clock signal which is the same as in the FIGS. 1 and 3. FIG. 4*b*) shows, by way of example, a variation of a binary output signal on the output 7 of the logic arrangement 1. This binary output signal contains the serial data values of two time-interleaved data streams. With the data values of a first one of the data streams there are associated the state transitions represented by the ascending edges of the clock signal, whereas with the data values of the second data stream there are associated the state transitions constituted by the descending edges of the clock signal. Because the storage in the (first) storage cell 9 takes place in response to the ascending edge of the clock signal whereas the storage in the further storage cell 121 takes place in response to the descending edge of the clock signal, the data values supplied via the output 7 of the logic arrangement 1 are stored in the form of separated data streams in the storage cells 9, 121, i.e. the first data stream is stored in the (first) storage cell 9 and the second data stream is stored in the further storage cell 121. FIG. 4 also shows the resultant signals, i.e. FIG. 4*c*) shows the first data stream as a binary output signal on the output 11 of the (first) storage cell 9, and FIG. 4*d*) shows the second data stream as a binary output signal on the output 124 of the further storage cell 121. In FIG. 4*b* the setting or transient phenomena in the binary output signal on the output 7 of the logic arrangement 1 are shown in the same way as in FIG. 3*b*). It can be seen that now only one half period of the clock signal is available for such compensation or setting or transient phenomena instead of a complete period of the clock signal. This reduced setting or transient time, however, constitutes the only requirement to be imposed on the logic arrangement in the circuit arrangement constructed according to the invention. The frequency of the clock signal, however, is not changed.

In conformity with the relevant state of the clock signal on the clock lead 13, the switching stage 127 again time interleaves the data streams on the outputs 11 and 124 of the storage cells 9 and 121 between the individual cyclically repetitive state transitions. This produces the temporal variation shown in FIG. 4*e*) for the output signal on the common output 6 of the circuit arrangement of FIG. 2. The data streams in this binary output signal are time-interleaved in the same way as that in which they have already been processed in the logic arrangement 1. On the one hand, this enables retrocoupling to the further input 5 of the logic arrangement 1 without additional circuit interventions being required, while on the other hand further logic signal processing stages, for example further logic arrangements, can be connected to the common output 6 of the circuit arrangement in the same way as in the circuit arrangement of FIG. 1 for the processing of a single data stream. In such an extended circuit arrangement, therefore, all storage arrangements constructed in the form of the storage arrangement 12 can be replaced by storage arrangements corresponding to the storage arrangement 120 of FIG. 2. Without requiring further modifications, such more extensive circuit arrangements can then be used for the time-interleaved processing of two data streams. In comparison with the processing of a single data stream, the storage cells themselves are not subject to a higher repetition frequency of the data values to be stored.

Should the data streams be output via separate outputs in an arrangement of the kind shown in FIG. 2, separate output can be achieved simply by omitting the switching stage 127 in a storage arrangement like the storage arrangement 120 of FIG. 2. The outputs 11 and 124 of the storage cells 9 and 121, respectively, are then fed out in parallel instead. The data streams can thus be very simply separated without utilizing an additional demultiplexer arrangement.

Figure 5:
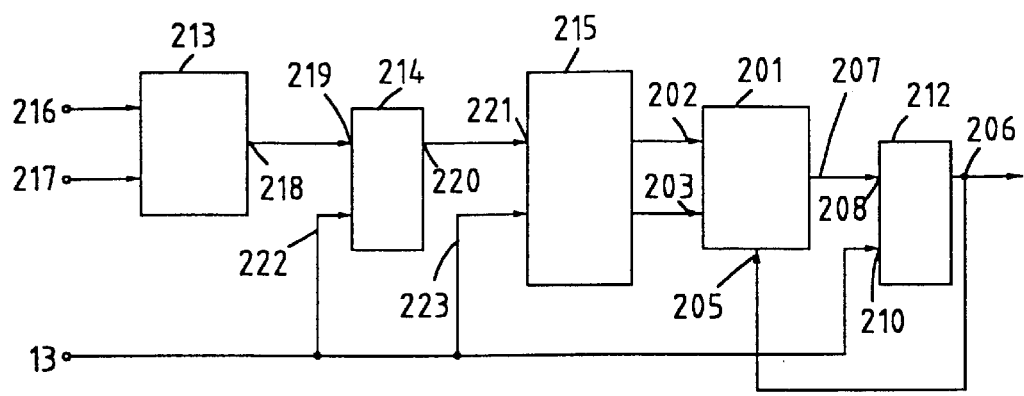
FIG. 5 shows a further version of the circuit arrangement of FIG. 1.

FIG. 5 shows an example of such a more extensive circuit arrangement. The reference 201 therein denotes a logic arrangement which is constructed like the logic arrangement 1 and has inputs 202, 203 and 205 as well as an output 207, which inputs and output correspond to the inputs 2, 3, 5 and the output 7 of the logic arrangement of FIG. 1. Connected thereto is a storage arrangement 212 which has a construction corresponding to that of the storage arrangement 12 of FIG. 1 and a signal input 208, a clock input 210 and an output which is connected to a common output 206 of the circuit arrangement. The arrangement of FIG. 5, corresponding to the construction shown in FIG. 1, also includes a further logic arrangement 213, a further storage arrangement 214 and a circuit block 215. The further logic arrangement 213 has two inputs 216, 217 via which binary signals can be supplied so as to be logically combined in the further logic arrangement 213. A resultant binary output signal of the logic arrangement 213 is output, via an output 218 of the further logic arrangement 213, and applied to a signal input 219 of the storage arrangement 214 so as to be stored therein. The binary signal stored in the storage arrangement 214 is output via an output 220 thereof so as to be applied to an input 221 of the circuit block 215. Like the clock input 210 of the storage arrangement 212, a clock input 222 of the further storage arrangement 214 is connected to the clock lead 13.

The circuit block 215 of the embodiment shown in FIG. 5 may also include further logic arrangements but also further storage arrangements. In order to control such further arrangements there is provided a clock input 223 which is also connected to the clock lead 13. In a preferred embodiment the circuit block 215 includes the so-called "Protocol Core" of a "Controller Area Network".

In the embodiment shown in FIG. 5 leads are connected directly from the circuit block 205 to the inputs 202, 203 of the logic arrangement 201.

Figure 6:
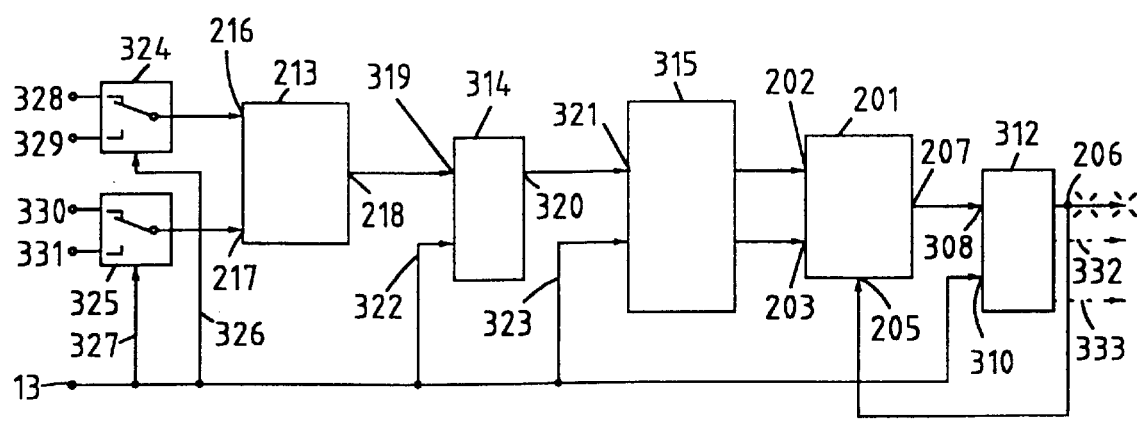
FIG. 6 shows a further version of the circuit arrangement of FIG. 5 with storage arrangements constructed according to the invention.

FIG. 6 shows a further version of the circuit arrangement of FIG. 5; in conformity with the version of FIG. 1 which is shown in FIG. 2, all simple storage arrangements, corresponding to the storage arrangement 12 of FIG. 1, have been replaced therein by storage arrangements in the form of the storage arrangement 120 shown in FIG. 2. Thus, the storage arrangement 212 of FIG. 5 is replaced in FIG. 6 by a storage arrangement 312 whose construction corresponds to that of the storage arrangement 120 of FIG. 2. The storage arrangement 312 has a signal input 308 and a clock input 310. In FIG. 6 they replace the signal input 208 and the clock input 210, respectively. The further storage arrangement 214 in FIG. 5 is replaced in FIG. 6 by a further storage arrangement 314 whose construction also corresponds to that of the storage arrangement 120 in FIG. 2. Moreover, storage arrangements present in the circuit block 215 are also replaced by storage arrangements corresponding to the storage arrangement 120. The circuit block thus modified is denoted by the reference 315 in FIG. 6. Its outputs are connected to the inputs 202, 203 of the logic arrangement 201 whereas its input 321 is connected to an output 320 of the further storage arrangement 314 and its clock input 323 is connected to the clock lead 13. The signal input 319 of the further storage arrangement 314 is connected to the output 218 of the further logic arrangement 213 whereas its clock input is connected to the clock lead 13. Thus, in order to change over from FIG. 5 to FIG. 6 it is merely necessary to replace the storage arrangements so as to change over from the processing of a single data stream to the time-interleaved processing of two data streams.

Should such separately supplied data streams be applied to the inputs 216, 217 of the further logic arrangement 213 in a time-interleaved manner, each of the inputs 216, 217 should be preceded by a respective further switching stage 324, 325 whose construction corresponds to that of the switching stage 127 of the storage arrangement 120 of FIG. 2. The further switching stages 324, 325 are also connected to the clock lead 13 by way of their control inputs 326, 327, respectively. In its first switching state, when the logic state of the clock signal is low, the first further switching stage 324 connects an input terminal 328 for a first binary signal of a first data stream to the first input 216 of the further logic arrangement 213. In a corresponding switching state the second further switching stage 325 connects an input terminal 330 for a second binary signal of the first data stream to the second input 217 of the further logic arrangement 213. However, when the clock signal assumes its high logic level, the further switching stages 324, 325 are also switched to their other states in which an input terminal 329 for a first binary signal of a second data stream is connected to the first input 216 of the further logic arrangement 213, whereas an input terminal 331 for a second binary signal of the second data stream is connected to the second input 217 of the further logic arrangement 213. The data streams, in which the repetition frequency of the data values corresponds to the frequency of the clock signal, are thus applied, time-interleaved data value, to the further logic arrangement 213. In this time-interleaved form they are further processed by the circuit arrangement up to the common output 206.

In a further version of the circuit arrangement shown in FIG. 6, in addition to the output of the switching stage which is included in the storage arrangement 312 and connected to the common output 206, the outputs of the storage cells included therein can also be fed out as additional outputs. This is represented by dashed lines in FIG. 6; the outputs of the storage cells therein are denoted by the references 332, 333. For example, the output 332 corresponds to the output of the storage cell for the first data stream, corresponding to the output 11 of the (first) storage cell 9 in the storage arrangement 120 of FIG. 2, whereas the output 333 for the second data stream corresponds to the output of the second storage cell provided instead in the storage arrangement 312, corresponding to the output 124 of the further storage cell 121 of the storage arrangement 120 of FIG. 2. Thus, in this version of the storage arrangement 312 the data streams are separated for output. Consequently, the common output 206 serves only for the retrocoupling of the time-interleaved output signal to the input 205 of the logic arrangement 201 and no longer for the output of a binary output signal of the overall circuit arrangement; this is indicated by the dashed crosses in FIG. 6.

What is claimed is:

1. A circuit arrangement for the processing of binary signals which includes:
   a first, second and third stage arranged in a sequential fashion, wherein the first and third stages comprise:
   at least one logic arrangement for outputting each time at least one binary output signal, and
   for each logic arrangement at least one storage arrangement for storing the binary output signal, or the binary output signals, at instants which are defined by a clock signal which exhibits state transitions which occur in a cyclical sequence,
   at least one of the storage arrangements including a number of storage cells, each of which includes a respective output and stores, at the instant of an associated state transition within each of the cycles of the clock signal, the instantaneous value of each time one of the binary output signals and outputs it via its output, the outputs of the storage cells of each time one of the storage arrangements being connected to a common output of the relevant storage arrangement via a switching stage whereby the output of each storage cell is connected, in the time interval which commences with the associated state transition of the clock signal and terminates with the next state transition of the clock signal in the cyclical sequence, to the common output of the relevant storage arrangement,
   wherein at least one of the storage arrangements includes two storage cells which are constructed as D-flipflops and whose clock inputs can be supplied with a clock signal in the form of an at least approximately square-wave signal, a first one of the D-flipflops of the at least one storage arrangement being driven by the ascending edge for the purpose of storage whereas the second one of the D-flipflops is driven by the descending edge, the switching stage being controlled in conformity with the levels of the clock signal between state transitions.

2. A circuit arrangement as claimed in claim 1, characterized in that the instantaneous values of the binary output signals at the instants of corresponding state transitions in successive cycles of the clock signals are associated with a respective, separate date stream.

3. A product for the electronic processing of data, characterized in that it includes a circuit arrangement as claimed in claim 1.

* * * * *